United States Patent [19]
Breitbach et al.

[11] Patent Number: 5,732,803
[45] Date of Patent: Mar. 31, 1998

[54] CURRENT COLLECTOR FOR TRANSMITTING ENERGY BETWEEN A CONTACT WIRE AND A MOTOR COACH

[75] Inventors: Elmar Breitbach, Göttingen; Andreas Büter, Braunschweig, both of Germany

[73] Assignee: Deutsche Forschungsanstalt für Luft-und Raumfahrt e.V., Germany

[21] Appl. No.: 746,244

[22] Filed: Nov. 7, 1996

[30] Foreign Application Priority Data

Nov. 8, 1995 [DE] Germany ............ 195 41 600.7

[51] Int. Cl.⁶ ............................ B60L 5/24; B60L 5/30
[52] U.S. Cl. ................... 191/70; 191/55; 191/65
[58] Field of Search .................... 191/45 R, 50, 191/54, 55, 64, 65, 66, 67, 68, 70

[56] References Cited

U.S. PATENT DOCUMENTS

| | | | |
|---|---|---|---|
| 3,106,272 | 10/1963 | Mohring | 191/55 |
| 3,830,990 | 8/1974 | Gray | 191/55 |
| 5,386,895 | 2/1995 | Ohuchi | 191/60.5 |
| 5,497,866 | 3/1996 | Kobayashi et al. | 191/55 |

FOREIGN PATENT DOCUMENTS

| | | |
|---|---|---|
| 0127741A1 | 12/1984 | European Pat. Off. . |
| 3104678A1 | 1/1982 | Germany . |
| 755632 | 8/1980 | U.S.S.R. ............ 191/70 |

*Primary Examiner*—S. Joseph Morano
*Attorney, Agent, or Firm*—Isaf, Vaughan & Kerr; Charles H. Fails

[57] ABSTRACT

A current collector for transmitting energy between a contact wire and a motor coach having at least one collector shoe (1) and at least one suspension spring (16) with a positive stiffness, the suspension spring supporting the collector shoe which lies with a contact force from below and against the contact wire. The suspension spring (16) is arranged in parallel with a correction spring (17), the correction spring having a negative stiffness in a zero-crossing of its spring characteristic curve, which coincides with the spring travel of the suspension spring (16), which spring travel corresponds to the desired contact force.

13 Claims, 5 Drawing Sheets

CURRENT COLLECTOR FOR TRANSMITTING ENERGY BETWEEN A CONTACT WIRE AND A MOTOR COACH

FIELD OF THE INVENTION

The invention relates in general to a current collector for transmitting energy between a contact wire and a motor coach more particularly, the invention relates to a current collector comprising at least one collector shoe and at least one suspension spring having a positive stiffness, the suspension spring supporting the collector shoe with a contact force from below and against the contact wire. Such current collectors are used with electrical rail vehicles.

BACKGROUND OF THE INVENTION

A current collector SSS 87 according to the type described above is known from the article ""406,9 Kilometer pro Stunde—Weltrekord auf der Schiene—Energieubertragung bei der Rekordfahrt des ICE der DB", elektrische Bahnen eb, Vol. 86, No. 9/1988, pages 268 to 289. This current collector comprises a rocker with two collector shoes arranged in parallel with each other and diagonally to the contact wire. Each of the collector shoes is supported on the rocker via two spring-loaded legs in the end regions of the collector shoes. The rocker itself is, tilting about a horizontal axis, connected to a lifting device consisting of upper pantograph and lower pantograph.

The lifting device is used for raising the rocker until the collector shoes lie from below against the contact wire with a certain contact force. This contact force is 120 Newton, for example. With raising the collector shoes against the contact wire, the spring-loaded legs supporting the collector shoes on the rocker, and to some extend the whole current collector also, give way until the mechanical suspension springs arranged in the spring-loaded legs summon up the required contact force as a reaction. During the drive of the motor coach, the collector shoes slide along the contact wire and lift the contact wire to a variable extend due to their elastic suspension, in dependence on the stiffness of the support of the contact wire varying from place to place. The contact wire is held and supported by a contact wire suspension which comprises points of support for the contact wire at distances of some 10 meters. With the contact wire suspension Re250, the distance of the points of support is 44 meters in a tunnel and 65 meters on the open line. Within the points of support, the stiffness of the suspension of the contact wire is maximum, so that the elastically supported collector shoes give more way and the lifting of the contact wire, due to the collector shoes lying against it, is minimum. In the middle between the points of support, the stiffness of the suspension of the contact wire is minimum, and accordingly, its lifting is maximum. This analysis considers the static correlation of forces between the elastic current collector and the elastic contact wire suspension. Apart from this, dynamical influences arise in operation of the current collector. With the movement of the collector shoes over the contact wire with variable lifting of the contact wire, dynamic excitations of the current collector and the contact wire are induced, which excitations in turn lead to an even higher variation of the contact force of the collector shoes against the contact wire. It is directly apparent that cause and effect can build up here. At the same time, the contact force must be kept within well defined limits to guarantee secure operation conditions of the current collector. Further, the contact force is aerodynamically affected by the air blowing against the current collector. Here however, it is possible to achieve a compensation to a large extent via wind deflecting profiles.

It is the problem of the invention to disclose a current collector of the type described at the beginning which experiences an as low as possible dynamic excitation by the variable lifting of the contact wire, within and between the points of support of the contact wire suspension.

SUMMARY OF THE INVENTION

This problem is solved here by the provision of a current collector having suspension spring including a positive stiffness arranged in parallel with a correction spring, the correction spring having a negative stiffness in a zero-crossing of its spring characteristic curve, and the zero-crossing of the correction spring coinciding with the spring travel of the suspension spring, which spring travel corresponds to the desired contact force. In this way a reduced total spring stiffness is given within the region of said spring travel, which stiffness is small compared with the stiffness of the suspension spring and which can also be zero. Thus, the contact force varies just marginally or not at all with the variable lifting of the contact wire. Herein, dynamic excitations of the contact wire suspension and of the current collector by the varying contact force are reduced or totally prevented i.e. The dynamic systems of the contact wire suspension and of the current collector are decoupled, because variations in the spring travel within the region of the desired contact force do not result in variations of the contact force, and hence, the desired contact force acts upon the current collector as a constant load.

In principle, correction springs having a negative stiffness in a zero-crossing of their force/travel-characteristic are known. These are magnetic springs in which magnetic poles of the same name oppose each other in the zero-crossing of the springs in a instable equilibrium. A positive or negative change of the spring travel leads the poles of the same name opposing each other out of the instable equilibrium, and the repulsive forces of the poles, which are coming into force then, result in the negative stiffness of the correction springs.

Such a correction spring may have solenoids, preferably however, each of the correction springs comprises two parts provided with permanent magnets, which parts are displaced relative to each other over the spring travel. particular effective correction springs having a negative stiffness are known from EP-0 127 741 A1 for the technical field of the suspension of vehicles. Here, each of the two parts of the correction springs comprises several permanent magnets arranged in series in direction of the spring travel, soft iron intermediate pieces being arranged between the permanent magnets, which are each adjoined by the neighbouring permanent magnets with poles of the same name. The soft iron intermediate pieces result in a focusing of the lines of magnetic flux or, that is to say, of the magnetic field which then emerges side-wards out of the soft iron intermediate pieces, i.e. radially away from the axial arrangement of the permanent magnets, and which forms a magnetic pole of the same name as the adjoining poles of the neighbouring permanent magnets. There, each correction spring may comprise several soft iron intermediate pieces at both parts, both parts comprising the same number of soft iron intermediate pieces which in pairs oppose each other in the zero-crossing.

Between the points of support and the points having a maximum distance to the points of support, the spring travel of the suspension spring in lifting the contact wire is in the order of 50 to 70 millimeters. With regard to the mean spring travel, such a spring travel means an excursion of the correction spring by 25 to 35 millimeters to both sides. Such excursions can not be covered by small magnetic correction springs without problem. Therefore, it is useful, if an increasing gear for the spring travel of the correction spring is provided. This increasing gear can also be provided for the suspension spring, if the suspension spring is relative stiff. With a less-stiff suspension spring it is favourable to arrange the increased correction spring in parallel with the suspension spring.

The increasing gear for the spring travel of the correction spring can be of different construction. Thus, it is possible, that each of the suspension springs comprises an mechanical spring ellipsoidally bent from spring band steel, or that each of the suspension springs is such a mechanical spring, the excursion of the respective correction spring being effected in the area of the great semiaxis and the transmission of the contact force onto the collector shoes being effected in the area of the small semiaxis of the ellipsoidal spring. Therein, the ellipsoidal spring itself acts as an increasing gear, the transmission ratio corresponding to the reciprocal of the semiaxes. With an ellipsoidal suspension spring, the correction spring is preferably arranged within the suspension spring, from which a compact construction results.

A modification of the ellipsoidal suspension spring is given, if each of the suspension springs comprises a forked spring made of spring band steel, or if each of the suspension springs is such a forked spring, the excursion of the respective correction spring being effected in the area of the free ends and the transmission of the contact force onto the collector shoes being effected in the area of the spring bulge of the forked spring. Here also, the correction spring can be arranged within the forked spring.

A hydraulic medium is provided in another embodiment of the increasing gear, a cross-sectional piston area via which the excursion of the respective correction spring acts upon the hydraulic medium being larger than a cross-sectional piston area via which the transmission of the contact force from the hydraulic medium onto the collector shoe is effected. The different cross-sectional piston areas result in an hydraulic increase of the string travel over which the correction spring is effective. Preferably, the hydraulic medium is incompressible, as it would otherwise form a gas spring connected downstream of the correction spring. However, each of the suspension springs arranged in parallel with the correction spring can comprise a gas spring, or can be such a gas spring, without problem. This gas spring can act upon the hydraulic medium via the same or a different cross-sectional piston area as/than the correction spring. With the same cross-sectional piston area the spring travel of the suspension spring is transmitted in the same way as the travel spring of the correction spring. Different transmission ratios result from a different cross-sectional piston area.

Pure mechanical embodiments of the increasing gear are also possible. Those can, for example, comprise a single lever, a double lever or a toggle lever. In a further mechanical embodiment the increasing gear comprises a beam drive.

With the new current collector also, it is advantageously, if two collector shoes are provided which are arranged in parallel and perpendicularly to the contact wire and which are supported on a rocker of the current collector each via two spring-loaded legs with suspension spring and correction spring, located in the end-regions of the collector shoes and operating separately. With those frequencies, in which relevant excitations of the current collector occur during high speed drives, this arrangement as such already has particular small virtual masses of the collector shoes. These virtual masses are further reduced by the correction springs in the spring-loaded legs.

In the following the invention is further explained and described by means of embodiment examples.

DETAILED DESCRIPTION

Figure 1:
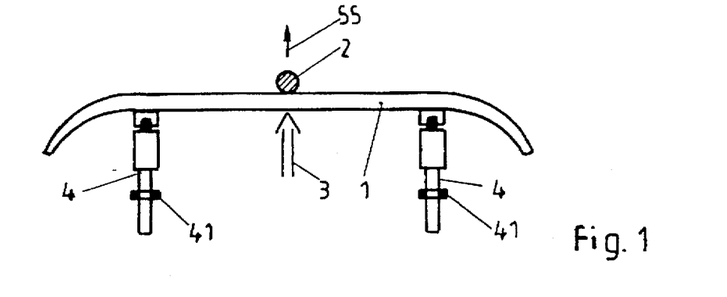
FIG. 1 is an end elevational view a collector shoe lying against a contact wire in the direction of the contact wire.

FIG. 1 shows a collector shoe 1 which lies from below and against a contact wire 2 with a contact force indicated by an arrow 3. The collector shoe 1 is, via two spring-loaded legs 4 arranged at its ends, supported on further elements of a current collector which are not depicted in FIG. 1. The spring-loaded legs 4 operate independently of each other, i.e. they can give way separately from each other. In applying the contact force 3 the spring-loaded legs 4 give way by a certain spring travel. At the same time, the contact wire 2 is lifted in direction of an arrow 55. The extent of the lifting 55 of the contact wire 2 depends on the stiffness of the suspension or rather of the support of the contact wire 2. In the points of support of a contact wire suspension, not depicted here, this stiffness is greater than between the points of support. Besides, the stiffness between the points of support is in a tunnel greater then on the open line, which is due to the smaller distance of the points of support of the contact wire suspension for the contact wire in a tunnel. Due to the variable lifting 55 of the contact wire, the spring travel of the spring-loaded legs, and therein normally the contact force also, varies continually. In consequence, a dynamic excitation of the elements of the current collector connected downstream of the spring-loaded legs 4, and also of the contact wire suspension connected downstream of the contact wire occurs with the collector shoes sliding over the contact wire 2.

Figure 2:
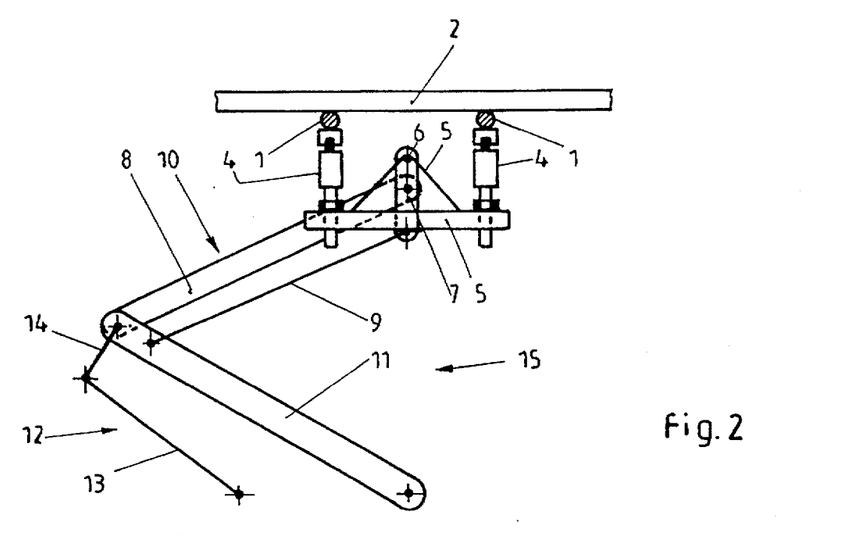
FIG. 2 shows a schematic side view of a current collector.

FIG. 2 shows the elementary structure of the whole current collector 15. A pair of collector shoes 1 is supported on a rocker 5 via the spring-loaded legs 4. The rocker 5 is, tilting about an axis 6, connected to a supporting piece 7. The supporting piece 7 itself is linked to the upper ends of a support bar 8 and a guide bar 9 of an upper pantograph 10. The support bar 8 and the guide bar 9 are rotatably connected to a support bar 111 of a lower pantograph 12, so that in total a four-bar chain is given. A second four-bar chain is formed in the area of the lower pantograph 12. Here, the lower ends of the support bar 11 and of a guide bar 13 are rotatably connected to a motor coach (not depicted). The upper end of the guide bar 13 is linked to a protruding extension element of the support bar 8 which is, as already mentioned, rotatably connected to the support arm 11. Due to the continuous rigid construction of the support bar 8 and the extension element 14, the two four-bar chains of the upper pantograph 10 and the lower pantograph 12 are coupled with each other. Thus, the whole current collector 15 is raised, if the support bar 11 is raised by an actuating device, not depicted here. Therein, the supporting piece 7 together with the rocker 5 and the collector shoes 1 supported on the rocker 5 are guided upwards in parallel directions. The current collector 14 normally comprises two support bars 8 which are as a pair arranged in parallel. Like the support bar 11 and the guide bar 13, the guide bar 9 is normally provided once.

Figure 3:
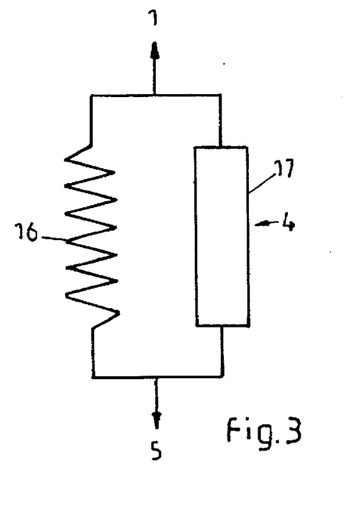
FIG. 3 shows an equivalent diagram of a correction spring arranged in parallel with a suspension spring.

FIG. 3 shows the elementary structure of the spring-loaded legs 4 in the new current collector. The spring-loaded legs 4 arranged between the collector shoes 1 and the rocker 5 comprise a suspension spring 16 and a correction spring 17. The suspension spring can be a mechanical spring, as indicated, and has a positive stiffness. i.e. an increase of the spring travel leads to an increase of the contact force applied by the suspension spring 16, and a decrease of the spring travel leads to a reduction of the contact force. Contrarily, the correction spring 17 has a negative stiffness in a zero-crossing of its spring characteristic curve, i.e. of its force/travel-characteristic. This zero-crossing coincides with the mean spring travel of the suspension spring 16.

Figure 4:
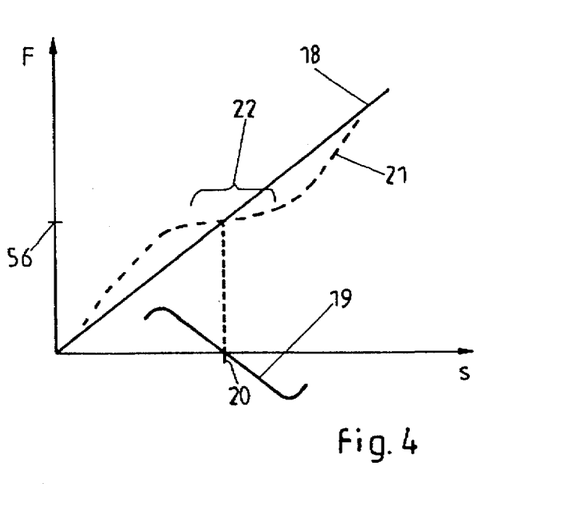
FIG. 4 shows the spring characteristic curve of the suspension spring and of the correction spring as well as the total characteristic curve.

The effects on the total characteristic curve are represented in FIG. 4. There, the spring force F is plotted over the spring travel s. The curve 18 is the spring characteristic curve or force/travel-characteristic of the suspension spring 16, and the curve 19 is the spring characteristic curve of the correction spring 17 which has a zero-crossing at 20. In a region 22, the total characteristic curve 21 has a plateau with a minimum or vanishing slope, i.e. a variation of the spring travel within the region 22 does not lead to a variation of the contact force F. instead the desired contact force 56 is preserved.

Figure 5:
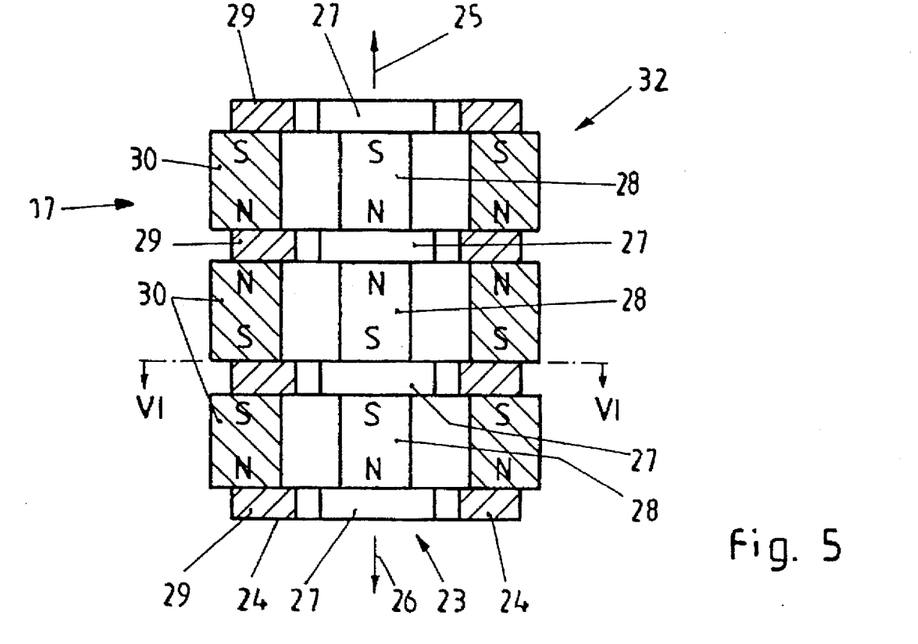
FIG. 5 shows the elementary structure of the correction spring in a longitudinal section.
Figure 6:
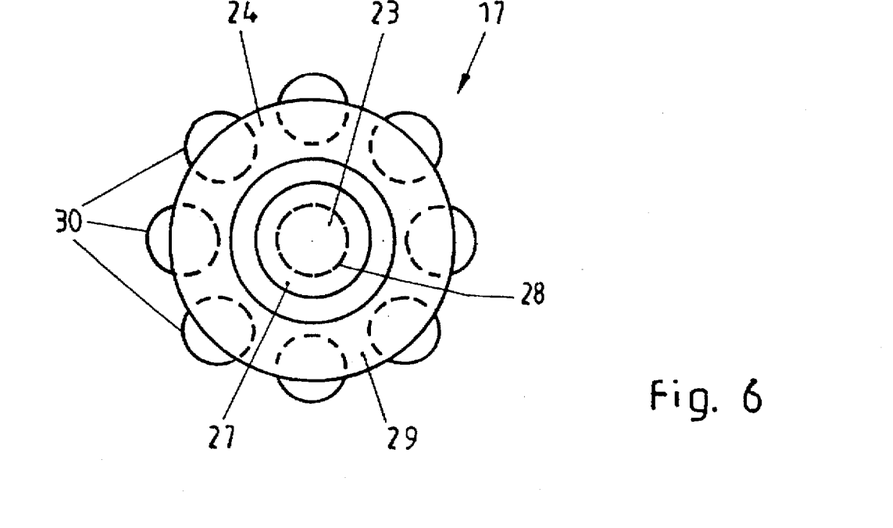
FIG. 6 shows the elementary structure of the correction spring in a cross-section.

A concrete example of a correction spring 17 is represented in FIGS. 5 and 6. The correction spring 17 comprises two parts 23 and 24 which are displaced in directions of arrows 25 and 26 relative to each other with variations of the spring travel. The part 23 of the correction spring 17 consists of permanent magnets 28 arranged on top of each other with soft iron intermediate pieces 27 in between. Therein, poles of the same name of the permanent magnets each adjoin one soft iron intermediate piece 27. Herein, a focusing of the lines of magnetic flux or rather of the magnetic field is achieved which thus emerges concentrated from the soft iron intermediate pieces 27 sideways. The soft iron intermediate pieces 27 of the part 23 are opposed by ring-shaped soft iron intermediate pieces 29 of the other part 24 in the zero-crossing 20. Permanent magnets 30 are arranged between the ring-shaped soft iron intermediate pieces 29, the arrangement of their poles corresponding to the arrangement of the poles of the permanent magnets 28. However, a plurality of permanent magnets 30 is arranged between every two soft iron intermediate pieces 29, as it is apparent from FIG. 6. The relative position of the parts 23 and 24 of the correction spring 17 depicted in FIG. 5 corresponds to the zero-crossing 20 according to FIG. 4 and is an instable equilibrium. As soon as there is an excursion of the part 23 relative to the part 14 in direction of the arrow 25 or 26, repulsive forces come into force between the soft iron intermediate pieces 27 and 28 opposing each other, which forces are directed towards an increase of the initial excursion.

Figure 7:
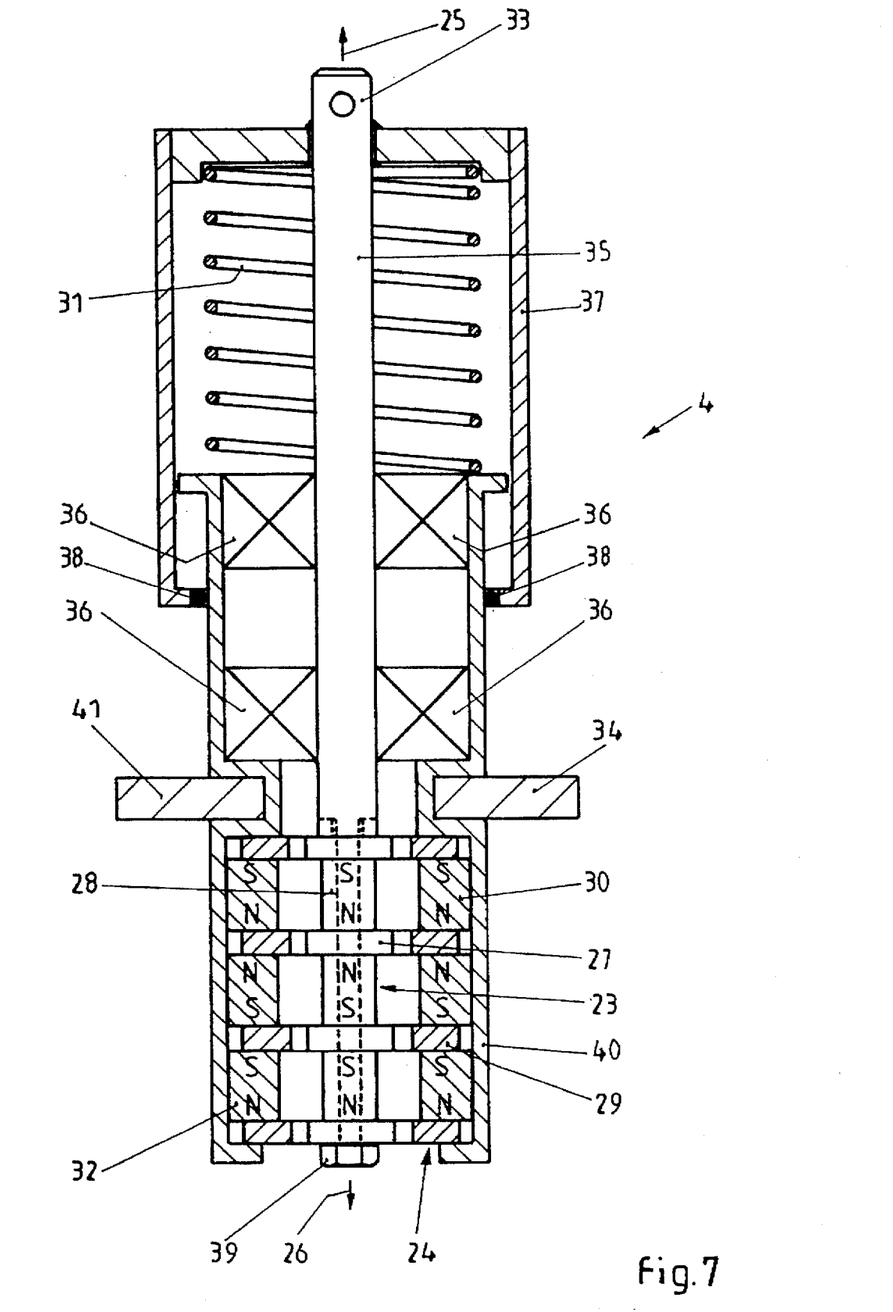
FIG. 7 shows the structure of a spring-loaded leg with suspension spring and correction spring in a longitudinal section.

FIG. 7 shows a concrete embodiment of the spring-loaded leg 4 in which a mechanical spring 31 as a suspension spring 16, and a magnetic spring 32 as a correction spring 17 are connected in parallel. The spring-loaded leg 4 comprises a part 33 on the collector shoe side and a part 34 on the rocker side. A guide bar 35 is fastened to the part 33 on the collector shoe side, which guide bar 35 is hollow for weight reduction. The guide bar 35 extends through the mechanical spring 31 and is connected to the part 34 on the rocker side via a ball bearing. Therein, the helical spring 31 is supported on one side on the part 33 on the collector shoe side and on the other side on the part 34 on the rocker side. The helical spring 31 is covered by a housing element 37, which is rigidly connected with the part 33 on the collector shoe side, while a sliding seal 38 is formed between the housing element 37 and the part 34 on the rocker side. The part 23 of the correction spring 17 is fastened to the bottom of the guide bar 35 via a through screw 39. The part 24 of the correction spring 17 is located in a housing element 40 of the part 34 on the rocker side of the spring-loaded leg 4. A collar 41 is used for supporting the part 34 on the rocker side on the rocker 5, and for transmitting forces from the part 34 on the rocker side to the rocker 5.

In FIGS. 8 to 13, different embodiments are depicted, by which the usable spring travel of the correction spring can be increased, if it is otherwise insufficient for covering the varying lifting 55 of the contact wire 2, as they occur during the normal operation of the current collector 15.

Figure 8:
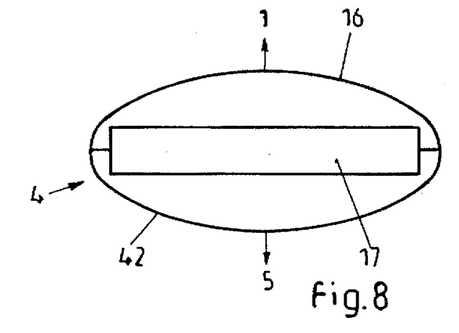
FIG. 8 shows a first arrangement for show different possibilities of increasing the spring travel of the correction spring.

In the embodiment according to FIG. 8, the suspension spring 16 is a mechanical spring 42 ellipsoidally bent from spring band steel. The correction spring 17 acts upon the ellipsoid spring 42 in the area of the great semiaxis. The contact force is applied in the region of the small semiaxis. In this way, the usable spring travel of the correction spring 17 is increased by the reciprocal of the ratio of the semiaxes.

Figure 9:
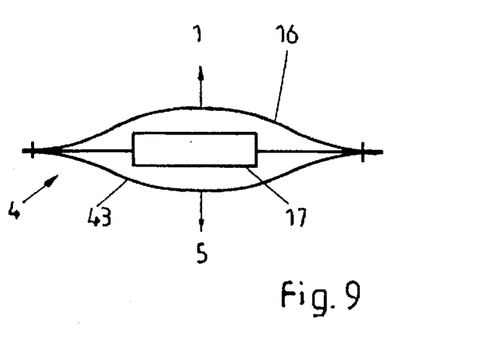
FIG. 9 shows a second arrangement for increasing the spring travel of the correction spring.

Similar transmission conditions result from the embodiment of the spring-loaded leg 4 according to FIG. 9. Here, the suspension spring 16 is a forked spring 43. The correction spring 17 acts upon the free ends of the forked spring 43. The contact force is applied between the spring bulges of the forked spring 43.

Figure 10:
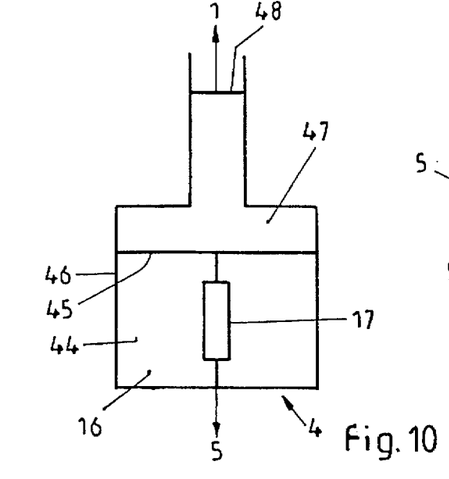
FIG. 10 shows a third arrangement for increasing the spring travel of the correction spring.

According to the principle indicated in FIG. 10, the suspension spring is a gas spring 44 which supports a piston 45. The correction spring 17 is also arranged between the housing 46 Of the gas spring 44 and the piston 45. The piston acts upon a hydraulic medium 47, on which in turn a piston 48 is supported. The piston 48 carries the collector shoe 1. The cross-sectional area of the piston 48 is smaller than the cross-sectional area of the piston 45, so that the usable spring travel of the correction spring 17 is increased by the ratio of the cross-sectional areas. In the embodiment of the spring-loaded leg 4 according to FIG. 10, the increasing is also related to the spring travel of the suspension spring 16.

Figure 11:
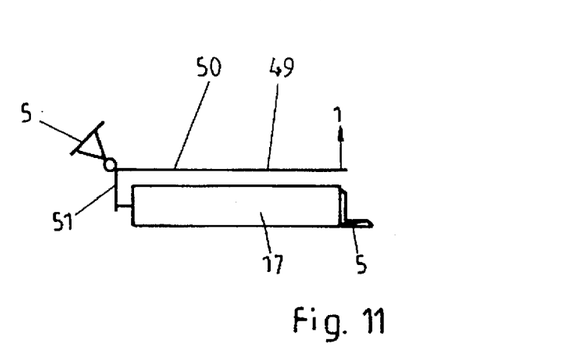
FIG. 11 shows a fourth arrangement for increasing the spring travel of the correction spring.
Figure 12:
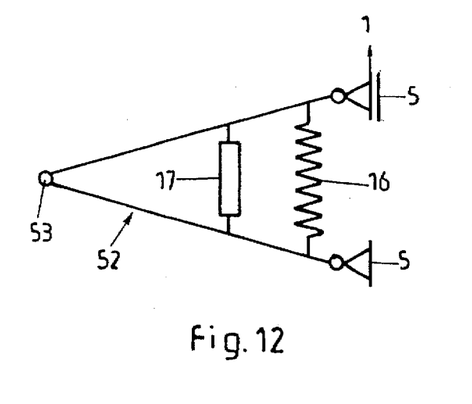
FIG. 12 shows a fifth arrangement for increasing the spring travel of the correction spring.
Figure 13:
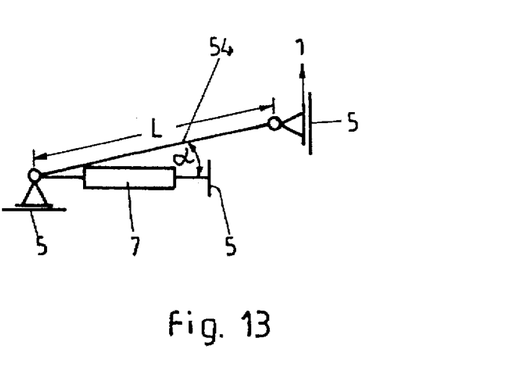
FIG. 13 shows a sixth arrangement for increasing the spring travel of the correction spring.

The embodiments of FIGS. 11, 12 and 13 relate to mechanically increasing the spring travel of the correction spring 17. According to FIG. 11 this increase is achieved by a double lever 49 having lever arms 50 and 51 of different length. The correction spring 17 acts upon the shorter lever arm 51.

According to FIG. 12 the increase is effected via a toggle lever arrangement 52. There, the correction spring 17 is located closer to the toggle link 53 than to the point of the transmission of the contact force to the collector shoe 1. The suspension spring 16 can be located between these two points. The principle of transmission according to FIG. 13 is called beam drive. Herein, the transmission ratio is dependent on the angle of inclination α and the length L of the beam 54 of the beam drive.

Figure 14:
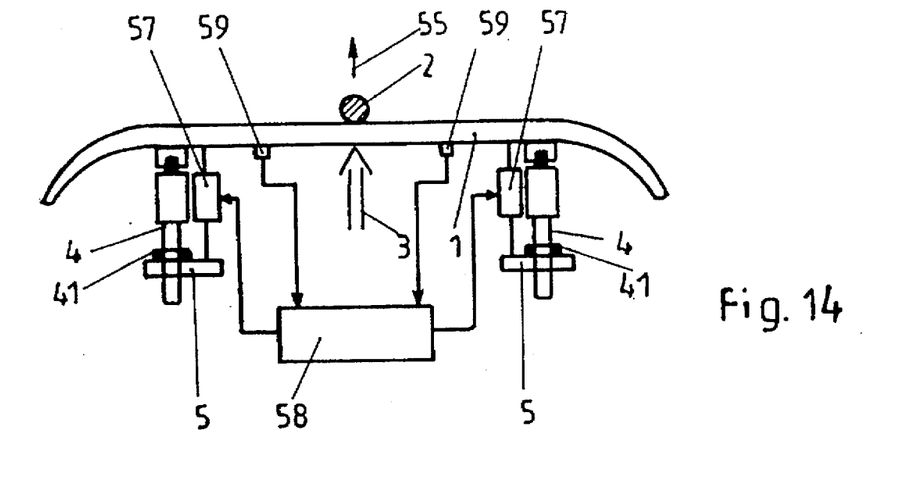
FIG. 14 shows an alternate embodiment of the current collector in an end elevational view.

In addition to the embodiment according to FIG. 1, the modified embodiment of the current collector 15 depicted in FIG. 14 comprises actuators 57 arranged in parallel with the spring-loaded legs 4 between the collector shoe 1 and the rocker 5. The actuators 57 are controlled by a control means 58 proportionally to the acceleration of the collector shoe 1, so that the collector shoe 1 is virtually without an inertia mass. Thus no contact forces which result from the inertia mass of the collector shoe occur between the collector shoe 1 and the contact wire 2. The acceleration of the collector shoe is registered by sensors 59.

While preferred embodiments of the invention have been disclosed herein, it is understood by those skilled in the art that variations and modifications thereof can be made without departing from the spirit and scope of the invention, as set forth in the following claims.

LIST OF REFERENCE NUMERALS

1—collector shoe
2—contact wire
3—contact force
4—spring-loaded leg
5—rocker
6—axis
7—supporting piece
8—support bar
9—guide bar
10—upper pantograph
11—support bar
12—lower pantograph
13—guide bar
14—extension element
15—current collector
16—suspension spring
17—correction spring
18—spring characteristic curve
19—spring characteristic curve
20—zero-crossing
21—total characteristic curve
22—region
23—part
24—part
25—arrow
26—arrow
27—soft iron intermediate piece
28—permanent magnet
29—soft iron intermediate piece
30—permanent magnet
31—helical spring
32—maqnetic spring
33—part, collector shoe side
34—part, rocker side
35—guide bar
36—ball bearing
37—housing element
38—seal
39—screw
40—housing element
41—collar
42—ellipsoid spring
43—forked spring
44—gas spring
45—piston
46—housing
47—hydraulic medium
48—piston
49—double lever
50—lever arm
51—lever arm
52—toggle lever
53—toggle link
54—beam
55—lifting
56—desired contact force
57—actuator
58—control means
59—senor

We claim:

1. A current collector for transmitting energy between a contact wire and a motor coach, the current collector being mounted on the motor coach, said current collector comprising:

at least one collector shoe, at least one suspension spring, said suspension spring having a positive stiffness and a spring travel, and being constructed and arranged to support the at least one collector shoe with a contact force exerted by said at least one suspension spring against and from below the contact wire, and at least one correction spring, said correction spring being spaced from and parallel to said at least one suspension spring, the at least one correction spring having a spring characteristic curve and a negative stiffness in a zero-crossing of said spring characteristic curve, wherein the zero-crossing of the at least one correction spring coincides with the spring travel of the at least one suspension spring, which spring travel corresponds to the desired contact force of the collector shoe against the contact wire.

2. The current collector according to claim 1, wherein said at least one correction spring comprises at least one magnetic spring.

3. The current collector according to claim 2, wherein said at least one correction spring comprises two parts, each one of said parts being provided with at least one permanent magnet, said parts being displaced relative to each other over the spring travel.

4. The current collector according to claim 3, wherein each of the two parts of the at least one correction spring comprises a spaced series of permanent magnets which extend in the direction of the spring travel of said at least one suspension spring, and a spaced series of soft iron intermediate pieces interspersed between the permanent magnets of said spaced series of permanent magnets, each respective one of said intermediate pieces being adjacent ones of said permanent magnets having magnetic poles of the same name.

5. The current collector according to claim 1, further comprising an increasing gear, said increasing gear being constructed and arranged to provide a spring travel for the at least one correction spring.

6. The current collector according to claim 1, wherein the at least one suspension spring comprises an elliptical mechanical spring said mechanical spring being formed spring band steel and having a great semiaxis and a small semiaxis with respect thereto, wherein the excursion of the corresponding at least one correction spring is effected in the area of the great semiaxis thereof, and the transmission of the contact force through the at least one collector shoe against the contact wire is effected in the area of the small semiaxis thereof.

7. The current collector according to claim 1, wherein said at least one suspension spring comprises a forked spring made of spring band steel having opposed free ends and a spring bulge intermediate the ends thereof, wherein the excursion of the corresponding at least one correction spring is effected in the area of the free ends of the forked spring, and the transmission of the contact force through the at least one collector shoe against the contact wire is effected in the area of the spring bulge of the forked spring.

8. The current collector according to claim 1, wherein said at least one suspension spring includes a hydraulic means, said hydraulic means including a hydraulic piston having a cross-sectional piston area upon which the excursion of the respective at least one correction spring acts to transmit the contact force from the at least one collector shoe against the contact wire.

9. The current collector according to claim 5, wherein the increasing gear comprises a single lever.

10. The current collector according to claim 5, wherein the increasing gear comprises a beam drive.

11. The current collector according to claim 1, wherein said current controller includes a rocker, said rocker supporting a pair of collector shoes thereon with a spring-loaded leg for each said collector shoe, each said spring loaded leg having a said suspension spring and a said correction spring, said spring loaded legs being located in an end-region of each said collector shoe and constructed and arranged to operate separately of the other.

12. The current collector according to claim 5, wherein the increasing gear comprises a double lever.

13. The current collector according to claim 5, wherein the increasing gear comprises a toggle lever.

* * * * *